US008005205B2

(12) United States Patent
Neumetzler et al.

(10) Patent No.: US 8,005,205 B2
(45) Date of Patent: Aug. 23, 2011

(54) PROTECTIVE PLUG FOR DISTRIBUTION FRAME DEVICES IN TELECOMMUNICATIONS AND DATA TECHNOLOGY

(75) Inventors: Heiko Neumetzler, Berlin (DE); Martin Beetz, Berlin (DE)

(73) Assignee: ADC GmbH, Berlin (DE)

( * ) Notice: Subject to any disclaimer, the term of this patent is extended or adjusted under 35 U.S.C. 154(b) by 234 days.

(21) Appl. No.: 11/993,403

(22) PCT Filed: Jun. 13, 2006

(86) PCT No.: PCT/EP2006/005681
§ 371 (c)(1), (2), (4) Date: May 12, 2010

(87) PCT Pub. No.: WO2006/136315
PCT Pub. Date: Dec. 28, 2006

(65) Prior Publication Data
US 2010/0221952 A1 Sep. 2, 2010

(30) Foreign Application Priority Data
Jun. 21, 2005 (DE) ........................ 10 2005 029 012

(51) Int. Cl.
*H04M 9/00* (2006.01)

(52) U.S. Cl. .................... 379/412; 379/437; 439/620.01

(58) Field of Classification Search .................. 379/412, 379/437, 399; 361/118-120; 439/620.01
See application file for complete search history.

(56) References Cited

U.S. PATENT DOCUMENTS

| | | | | |
|---|---|---|---|---|
| 4,149,211 | A * | 4/1979 | DeHoff | 361/119 |
| 4,420,792 | A | 12/1983 | Hegner et al. | |
| 4,575,840 | A * | 3/1986 | Hargrave et al. | 370/463 |
| 4,741,711 | A * | 5/1988 | Singer, Jr. | 439/620.26 |
| 4,854,884 | A | 8/1989 | Unger | |
| 4,875,868 | A * | 10/1989 | Cwirzen et al. | 439/188 |
| 5,172,295 | A | 12/1992 | Hegner et al. | |
| 5,523,916 | A | 6/1996 | Kaczmarek | |
| 6,099,343 | A | 8/2000 | Bonvallat et al. | |
| 6,104,591 | A | 8/2000 | Casey et al. | |

(Continued)

FOREIGN PATENT DOCUMENTS

DE 24 28 266 12/1975

(Continued)

*Primary Examiner* — Gary F. Paumen
(74) *Attorney, Agent, or Firm* — Merchant & Gould P.C.

(57) ABSTRACT

The invention relates to a protected plug socket (20) for distribution devices in telecommunications and data technology, comprising at least one housing (21) and at least one protective element (12), said protective element (12) comprising at least two contact posts (9-11), at least two contact elements (24*a-c*) being embedded in the housing (21), the contact elements (24*a-c*) each comprising a line contact (22*a, b*) and a clamping contact (24*a-c*), wherein the line contact (22*a, b*) is arranged in a plugging-in region and the clamping contact is arranged in a housing region of the protected plug socket (20). The contact posts (9-11) of the protective element (12) are in contact with the clamping contacts (24*a-c*), the protective element (12) is connected to a plugging-in aid (1), made from an electrically non-conducting material and the plugging-in aid (1) comprises at least one housing for the contact posts (9-11) in which the contact posts (9-11) are mechanically fixed, the plugging in aid (1) being arranged between the clamping contacts (24*a-c*) and/or elements of the housing (21).

8 Claims, 5 Drawing Sheets

U.S. PATENT DOCUMENTS

Figure 1:
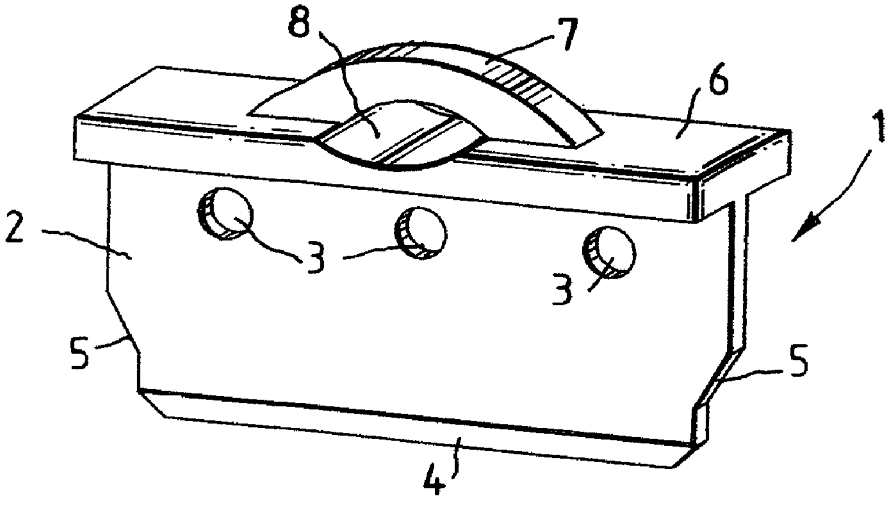

| | | | | |
|---|---|---|---|---|
| 6,324,283 | B1 | 11/2001 | Garver et al. | |
| 6,617,974 | B2 * | 9/2003 | Stanek | 340/638 |
| 2002/0175823 | A1 * | 11/2002 | Stanek | 340/639 |
| 2005/0063531 | A1 * | 3/2005 | Arias | 379/325 |
| 2006/0256931 | A1 * | 11/2006 | Bendig | 379/26.01 |

FOREIGN PATENT DOCUMENTS

| | | |
|---|---|---|
| DE | 31 13 759 | 10/1982 |
| DE | 9001 687.4 | 5/1990 |
| DE | 41 14 947 | 8/1992 |
| WO | WO 93/07654 | 4/1993 |

* cited by examiner

PROTECTIVE PLUG FOR DISTRIBUTION FRAME DEVICES IN TELECOMMUNICATIONS AND DATA TECHNOLOGY

The invention relates to a protective plug for distribution frame devices for telecommunications and data technology.

Protective plugs for distribution frame devices are used for protection against overvoltages and/or current surges.

DE 24 28 266 A1 has disclosed a surge arrester device for isolating blocks having contact elements, which are mounted in insulating material contact carriers and protrude therefrom with the ends in the form of conductor connection points, and an accommodating housing for the purpose of inserting and latching-in the contact carriers individually, said surge arrester device being in the form of a withdrawable component which accommodates in each case a large number of, preferably ten, surge arresters, has plugging edges, is composed of two plastic plates, can be inserted laterally into the isolating block housing, has a continuous knife edge on the underside for the purpose of providing a connection to ground, bears separate sliding contacts on the upper side which serve the purpose of making contact with the isolating block conductor connections to be protected, and has recesses, which are arranged such that they are offset in two rows between the upper side and the underside for the purpose of inserting in each case one surge arrester, a metal strip, which is integrally formed on the knife edge and is passed up to the underside of the recess, and a contact strip, which ends in the associated sliding contact and is passed up to the upper side of the recess, being embedded in an insulated manner in the plastic plates for the purpose of making contact with said surge arrester.

Contact is preferably made with the surge arresters at their contact points by means of clamping pressure, compression springs being provided which are accommodated in shell-shaped dents in a plastic plate, push the contact strips, which are bent back at right angles at the recess-side end, against the surge arrester contacts and thus at the same time press the underside contacts of the surge arresters in a clamping manner against the metal strips which are in this case likewise bent back.

DE 31 13 759 A1 has disclosed a surge arrester device for isolating blocks in the form of a withdrawable block formed from insulating material, the two-way surge arresters, which are formed with three connection legs, being plugged with the outer connection legs into clamping holders, which form tapping contacts which are accessible from the outside, and with the central connection leg into the clamping holder which is integrally formed on a U-shaped grounding strip which forms a grounding loop rail which is accessible from the outside, the surge arrester device also having a spring-loaded device, which is accessible via an opening, having a fixedly resting solder bead between the central electrode and the ground rail.

DE 41 14 947 C1 has disclosed a protective plug for connection to a contact component in a distribution frame of a telecommunications system, in particular a telephone system, having surge arresters and fuses, by means of which incoming and outgoing lines to and from the contact component can be connected to one another, the contact component being provided with contact springs which lie opposite one another in pairs and of which one is connected to one of the incoming cable cores and the other is connected to one of the outgoing cable cores, and which have contact zones at their free ends, it being possible for contact to be made between the contact zones and contact faces of the protective plug which can correspondingly be inserted, the contact faces being formed on contact parts which connect the contact faces to the ends of the fuse and to one end of the surge arrester, the protective plug having two separate contact faces having different qualities for each one of the contact springs in a contact spring pair, it being possible for contact to be made between said two separate contact faces and a contact zone of the contact spring such that the two separate contact faces are formed on two separate contact parts, of which one contact part leads to the surge arrester, and the other contact part leads to the fuse, and such that that end which bears the contact face can be deflected in a resilient manner in the case of one of the two contact parts.

The advantage of all of the protective plugs mentioned is the fact that the protective elements are replaceable, whereas typically in designs with printed circuit boards the protective elements are soldered. One disadvantage of the known protective plugs, on the other hand, is the fact that they are relatively complex to produce, in particular owing to the resilient elements. A further disadvantage is the fact that it is difficult to fit and remove individual protective elements. When the protective elements have contact legs, as described in DE 31 13 759 A1, it is especially necessary to ensure that uniform contact is made with these contact legs.

The invention is therefore based on the technical problem of providing a protective plug in which the protective elements can be mounted and removed in a simple and reliable manner and which is simple in design terms.

For this purpose, the protective element is connected to an insertion aid which is made from an electrically nonconductive material, the insertion aid having at least one receptacle for the contact legs in which the contact legs are mechanically fixed, the insertion aid being fixed between the clamping contacts and/or elements of the housing. The insertion aid allows for simultaneous contact to be made with all of the contact legs of the protective element, as a result of which the contact legs cannot be damaged or bent as is the case when contact is made with one contact leg after the other. Furthermore, the insertion aid ensures that precise contact is always made with the contact legs such that erroneous insertions are prevented. The insertion aid remains in the protective plug together with the protective element and ensures that the protective element cannot become detached again. Furthermore, the protective element can be removed again without causing any damage using the insertion aid. The insertion aid and the housing of the protective plug are preferably made from plastic. The clamping contacts are preferably in the form of fork contacts. The contact elements are preferably injection molded into the housing. All of the contact elements and possibly further contacts are further preferably formed from an integral part and injection molded. Subsequently, the necessary isolated sections are produced between the contact elements by means of drilled holes. The contact elements are preferably made from a copper alloy. The receptacles of the insertion aid are preferably in the form of holes, further preferably one hole being associated with each contact leg.

In a further preferred embodiment, the protective element has a third contact leg, a third clamping contact being arranged between the two first clamping contacts and being connected to the third contact leg, the third clamping contact being connected to a terminal rail, which is preferably connected or formed integrally with the third clamping contact(s). The protective element is preferably in the form of a surge arrester.

In a further preferred embodiment, the two first clamping contacts lie on one plane, the third clamping contact being arranged on a plane which is offset parallel, the insertion aid being clamped between the two first clamping contacts and the third clamping contact. In this case, the clamping contacts form an insertion shaft.

In a further preferred embodiment, a dome having a bevel is arranged opposite the clamping contact, a U-shaped part adjoining said bevel, the base of the U-shaped part lying on the plane of the first clamping contacts and having a notch. In this case, the notch is aligned with the third clamping contact such that the notch delimits the insertion depth of the third contact leg. The base of the U-shaped part is in this case part of the insertion shaft formed. The dome on the one hand acts as a lever bearing when removing the insertion aid and on the other hand serves the purpose of stabilizing the U-shaped part. The bevel on the dome in this case acts as a guide for a lever tool. In this case, embodiments are possible in which the U-shaped part or the dome can be dispensed with.

In a further preferred embodiment, a web is arranged between two adjacent clamping contacts of different pairs of cores, a further web, which lies on the plane of the third clamping contacts and has in each case a notch in the region of the first clamping contacts, adjoining said web centrally at a right angle. The notches, which are in this case aligned with the clamping contacts, in this case again serve to delimit insertion. The web itself becomes part of the insertion shaft. The first web is used for electrical insulation purposes and thus increases the dielectric strength.

In a further preferred embodiment, the insertion aid is formed with a handle on the upper side, by means of which the insertion aid can be gripped better. The insertion aid is preferably notched beneath the handle, with the result that a drawing tool or lever tool can be inserted more easily between the handle and the upper side.

Figure 2:
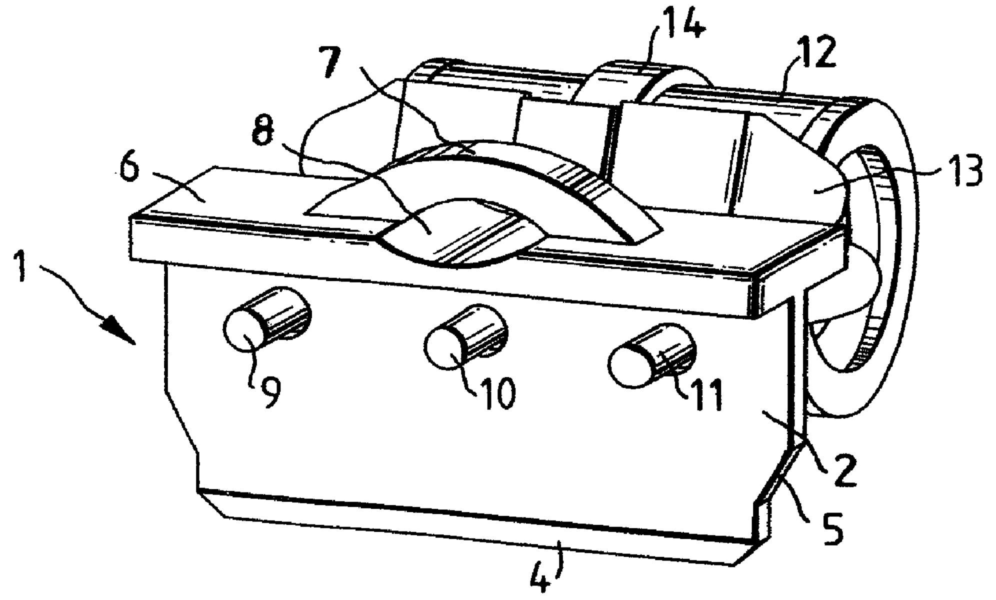
Figure 3:
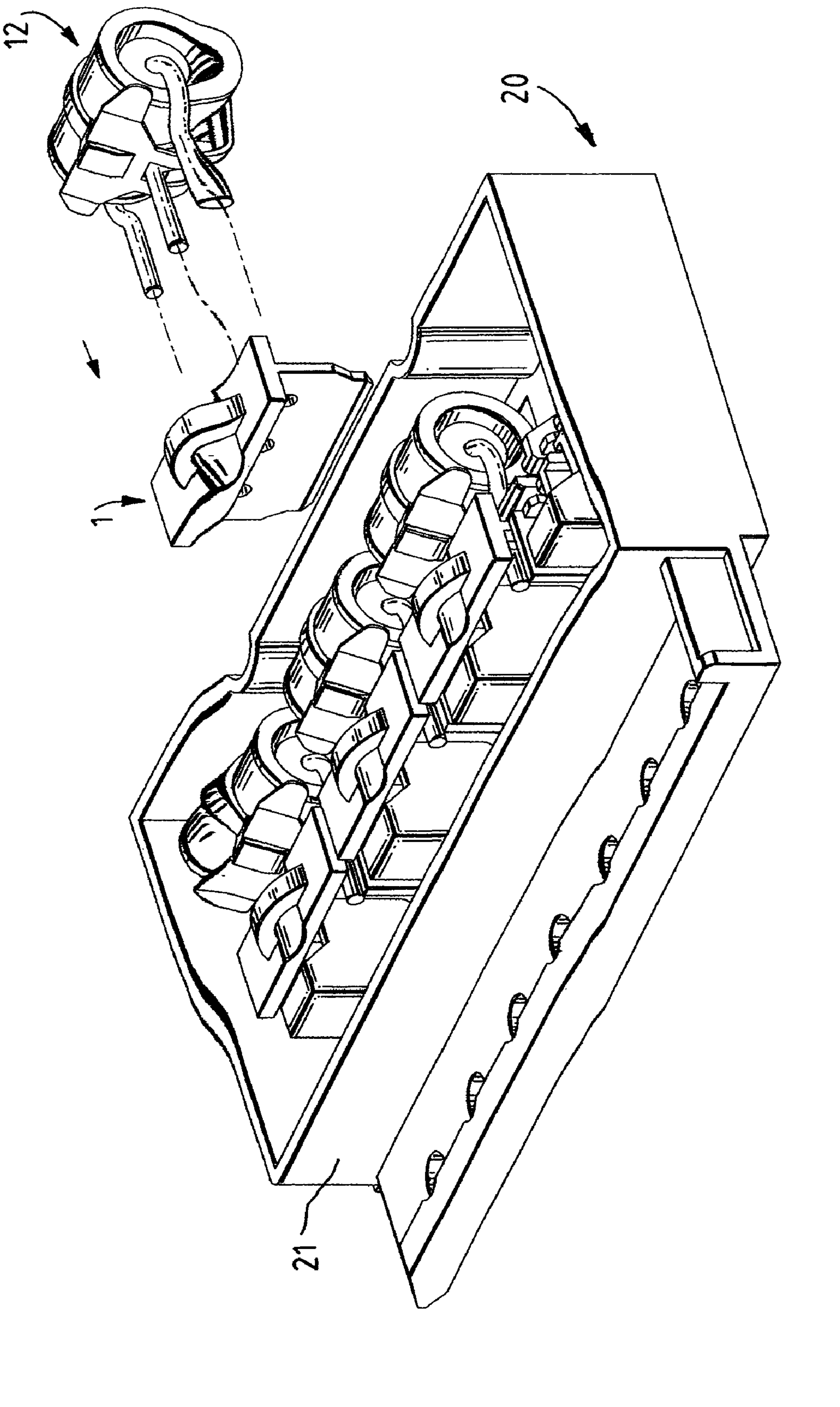
Figure 4:
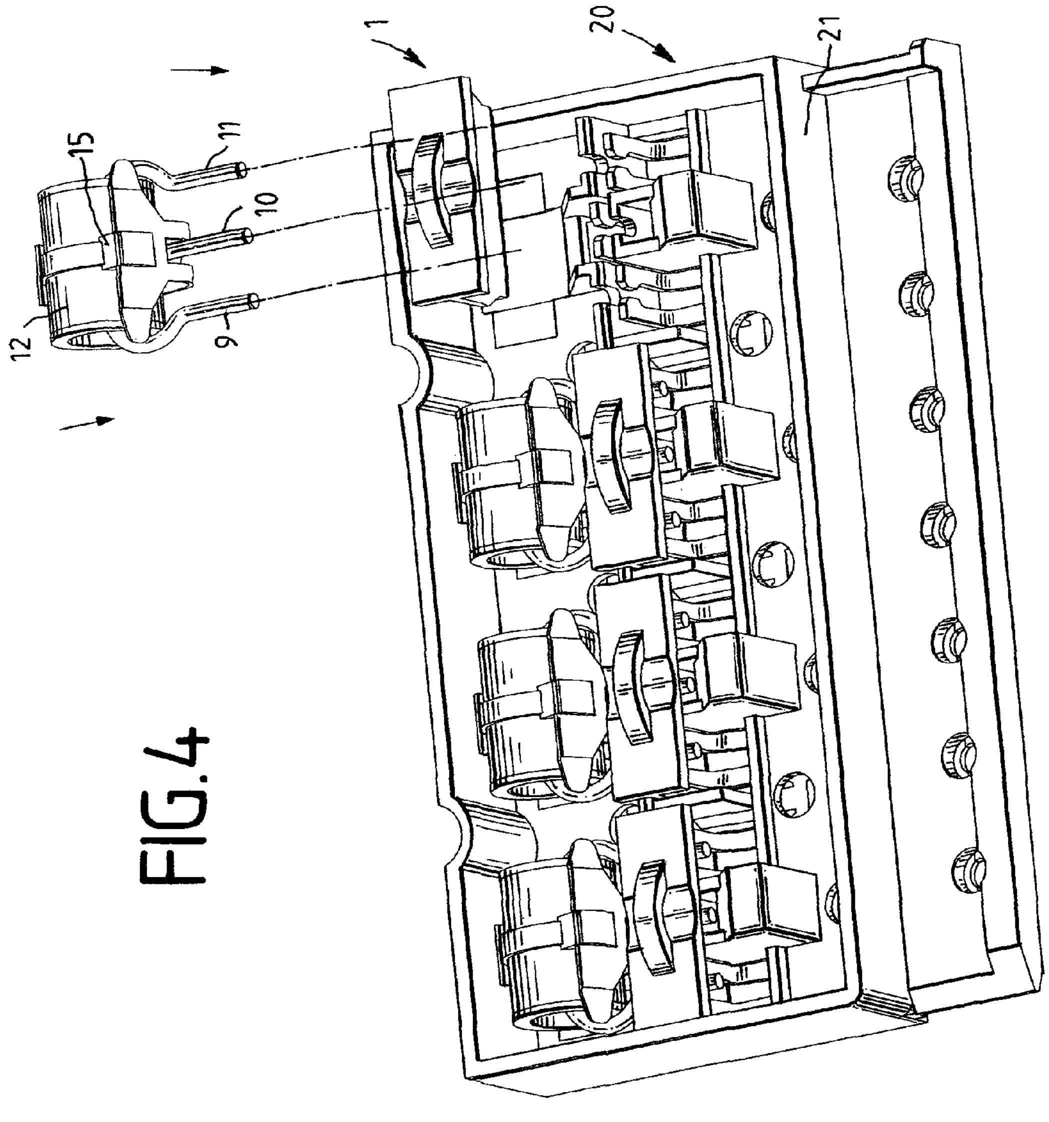
Figure 5:
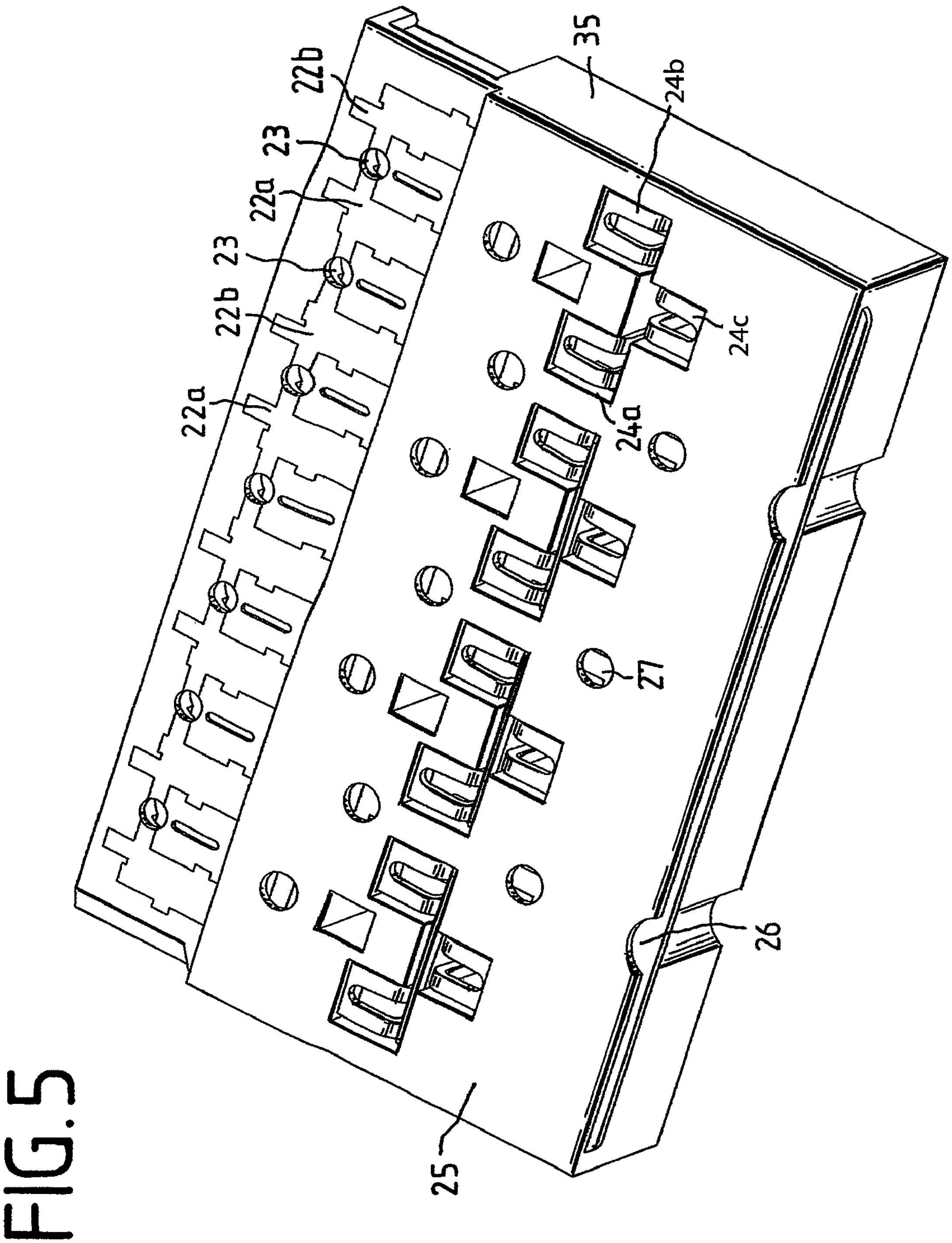
Figure 6:
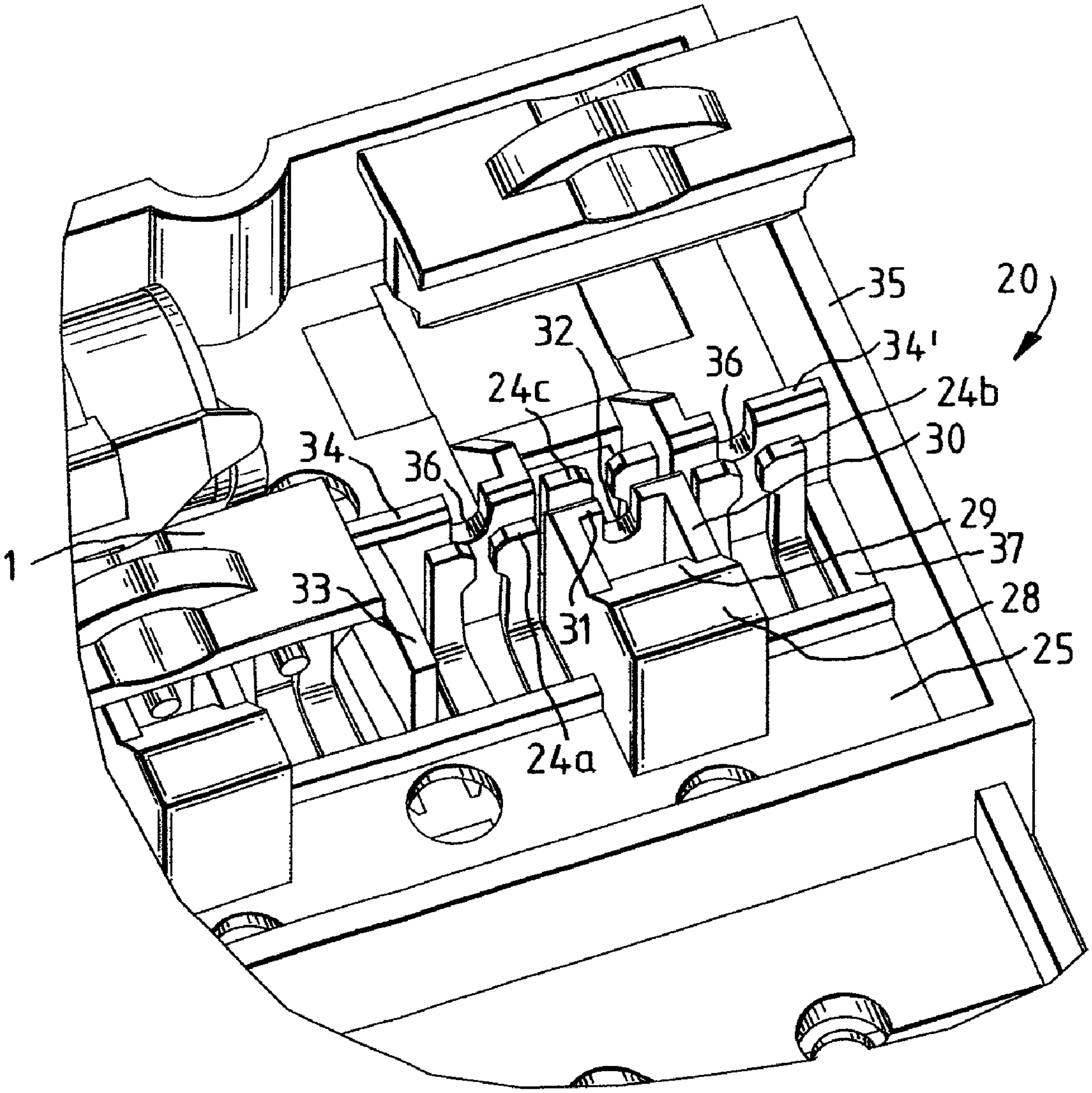

The invention will be explained in more detail below with reference to a preferred exemplary embodiment. In the figures:

FIG. 1 shows a perspective illustration of an insertion aid without a protective element, FIG. 2 shows a perspective illustration of the insertion aid with a protective element, FIG. 3 shows a first perspective illustration of a protective plug having four protective elements, FIG. 4 shows a second perspective illustration of the protective plug, FIG. 5 shows a third perspective illustration of the protective plug, and FIG. 6 shows a perspective illustration of a detail from FIG. 4.

FIG. 1 shows the insertion aid 1. The insertion aid 1 comprises a plate 2 having three receptacles 3 in the form of holes. The plate 2 is formed with a sharp edge 4 in the lower region. The plate 2 has a lateral bent edge 5, with the result that the width of the plate 2 is reduced. A further plate 6, which forms the upper side of the insertion aid 1, rests perpendicularly on the plate 2. A handle 7 is arranged on the plate 6, the plate 6 having a concave curvature 8 below the handle 7. FIG. 2 now shows how the contact legs 9-11 of a protective element 12 in the form of a two-way surge arrester are inserted into the receptacles 3 of the insertion aid 1, where they are mechanically fixed. The surge arrester is formed with a short-circuiting link 13, a solder bead 15 (visible in FIG. 4) being arranged between the central contact 14 and the short-circuiting link 13.

FIGS. 3 and 4 illustrate the protective plug 20 with four insertion aids 1 and protective elements 12. The protective plug comprises a housing 21 in the form of a withdrawable cartridge. The protective plug 20 can be split into three imaginary subregions, namely an insertion region, an accommodating region and a ground connection region. As can be seen in FIG. 5, the protective plug has eight line contacts 22*a, b*, in each case one line contact 22*a* and one line contact 22*b* being associated with a pair of cores (not illustrated) of a distribution frame device. Drilled holes 23, by means of which the line contacts 22*a, b* are electrically isolated from one another, are provided between the line contacts 22*a*, 22*b*. Each line contact 22*a, b* has an associated clamping contact 24*a, b* to which it is electrically connected. The clamping contacts are bent upwards perpendicular to the base plate 25 and lie parallel on one plane. FIG. 5 also shows a terminal rail 26 which is electrically connected to third clamping contacts 24*c* which are likewise bent upwards perpendicular to the base plate. The drilled holes 27 serve the purpose of electrically isolating the third clamping contacts 24*c* from the first two clamping contacts 24*a, b*. A ground connection to a support structure (not illustrated) for the distribution frame device takes place via the ground rail 26.

With reference to FIG. 6, the entire design of the protective plug 20 will be explained in more detail below. As has already been explained, the two clamping contacts 24*a, b* associated with the line contacts 22*a, b* lie on one plane. A dome 28 having a bevel 29 extends upwards from the base plate 25. Adjoining this dome 28 is a U-shaped part 30, whose base 31 has a notch 32. The base 31 lies on the same plane as the two first clamping contacts 24*a, b*. The notch 32 is aligned with the third clamping contact 24*c* which is displaced in the direction of the ground rail 26 parallel to the two first clamping contacts 24*a, b*. A web 33, which is adjoined perpendicularly and centrally by a further web 34, lies between the clamping contact 24*a* and a clamping contact (hidden by the inserted insertion aid 1) of an adjacent pair of cores, the left-hand half of the web 34 likewise being hidden by the insertion aid 1. The web 34 lies on the same plane as the third clamping contact 24*c*. A web 34', which likewise lies on the plane of the clamping contact 24*c*, likewise extends from the side wall 35 of the housing 21. The web 34' in this case represents half a web 34 since the web 33 can be dispensed with on the side wall 35. The webs 34, 34' likewise have notches 36 which are aligned with the two first clamping contacts 24*a, b*. The notches 32, 36 in this case delimit the insertion depth of the contact legs 9-11. As is shown, the web 34, the third clamping contact 24*c*, the web 34', the side wall 35, the clamping contact 24*b*, the base 31, the clamping contact 24*a* and the web 33 form an insertion shaft into which the insertion aid 1 can be inserted. The insertion aid 1 is in this case dimensioned such that it fills the entire insertion shaft and thus electrically insulates the opposing clamping contacts 24*a-c* (line contacts and ground contact) from one another and thus achieves a high dielectric strength. A rib 37 runs up from the base plate 25 on the side wall 35, for which reason the insertion aid 1 is formed with the bent edge 5 and thus the sharp edge 4 can slide past the rib 37.

LIST OF REFERENCES

1 Insertion aid
2 Plate
3 Receptacles
4 Sharp edge
5 Bent edge
6 Plate
7 Handle
8 Concave curvature
9-11 Contact legs
12 Protective element
12 Short-circuiting link

14 Central contact
15 Solder bead
20 Protective plug
21 Housing
22*a, b* Line contacts
23 Drilled holes
24*a, b, c* Clamping contacts
25 Base plate
26 Ground rail
27 Drilled holes
28 Dome
29 Bevel
30 U-shaped part
31 Base
32 Notches
33 Web
34, 34' Web
35 Side wall
36 Notches
37 Rib

The invention claimed is:

1. A protective plug for distribution frame devices for telecommunications and data technology, comprising:

at least one housing including at least three contact elements, the contact elements each having a line contact and a clamping contact, the line contacts being arranged in an insertion region, and the clamping contacts being arranged in an accommodating region of the housing, wherein two of the clamping contacts are positioned on a first plane and a third of the clamping contacts is positioned on a second plane that is offset parallel to the first plane;

at least one protective element having at least three contact legs, contact being made between the contact legs of the protective element and the clamping contacts of the housing; and an insertion aid which is made from an electrically nonconductive material, the insertion aid having at least one receptacle configured to mechanically fix the contact legs of the protective element, the insertion aid being clamped between the two clamping contacts and the third clamping contact to fix the insertion aid to the housing.

2. The protective plug as claimed in claim 1, wherein the third clamping contact is connected to a ground rail.

3. The protective plug as claimed in claim 2, wherein the ground rail is connected integrally to the third clamping contact.

4. The protective plug as claimed in claim 1, wherein a projecting member having a bevel is arranged opposite the third clamping contact, a U-shaped part adjoining said bevel, a base of the U-shaped part lying on the first plane of the two clamping contacts and having a notch.

5. The protective plug as claimed in claim 1, wherein a plurality of protective elements and a plurality of sets of three contact elements are provided, wherein a first web is arranged between each two adjacent clamping contacts of different sets, and wherein a further web lies on the second plane of the third clamping contacts of each set, each further web having a notch in a region of the respective two clamping contacts, and each further web adjoining said first web centrally at a right angle.

6. The protective plug as claimed in claim 1, wherein the insertion aid is formed with a handle on the upper side.

7. An insertion aid for a protective element which is made from a nonconductive material, comprising:

a first plate extending from an upper region to a lower region along a plane, the first plate defining three receptacles aligned in a row and extending through the plane, the first plate being formed with a sharp edge in the lower region;

a cross member extending perpendicularly across the upper region of the first plate;

a curved handle extending upwardly from the cross member, the cross member having a concave curvature below the handle.

8. The insertion aid of claim 7, wherein the lower region of the first plate has a lateral bent edge, whereby a width of the first plate is reduced at the lower region relative to the upper region.

* * * * *

UNITED STATES PATENT AND TRADEMARK OFFICE
CERTIFICATE OF CORRECTION

PATENT NO. : 8,005,205 B2
APPLICATION NO. : 11/993403
DATED : August 23, 2011
INVENTOR(S) : Neumetzler et al.

It is certified that error appears in the above-identified patent and that said Letters Patent is hereby corrected as shown below:

Title Page (74) Attorney, Agent or Firm should read - Merchant & Gould P.C.

Title page, (57) Abstract: The Abstract is not printed correctly. The Attorney and Agent information and the word "ABSTRACT" overlay the top of the printed abstract.

(57) ABSTRACT

The invention relates to a protected plug socket (20) for distribution devices in telecommunications and data technology, comprising at least one housing (21) and at least one protective element (12), said protective element (12) comprising at least two contact posts (9-11), at least two contact elements (24a-c) being embedded in the housing (21), the contact elements (24a-c) each comprising a line contact (22a, b) and a clamping contact (24 a-c), wherein the line contact (22a, b) is arranged in a plugging-in region and the clamping contact is arranged in a housing region of the protected plug socket (20). The contact posts (9-11) of the protective element (12) are in contact with the clamping contacts (24a-c), the protective element (12) is connected to a plugging-in aid (1), made from an electrically non-conducting material and the plugging-in aid (1) comprises at least one housing for the contact posts (9-11) in which the contact posts (9-11) are mechanically fixed, the plugging in aid (1) being arranged between the clamping contacts (24a-c) and/or elements of the housing (21).

Signed and Sealed this
Tenth Day of April, 2012

David J. Kappos

David J. Kappos
*Director of the United States Patent and Trademark Office*